United States Patent
Kang

(10) Patent No.: US 11,810,718 B2
(45) Date of Patent: Nov. 7, 2023

(54) CAPACITOR COMPONENT

(71) Applicant: SAMSUNG ELECTRO-MECHANICS CO., LTD., Suwon-si (KR)

(72) Inventor: Suji Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 55 days.

(21) Appl. No.: 17/687,236

(22) Filed: Mar. 4, 2022

(65) Prior Publication Data

US 2023/0135292 A1 May 4, 2023

(30) Foreign Application Priority Data

Oct. 29, 2021 (KR) ........................ 10-2021-0146877

(51) Int. Cl.
*H01G 4/12* (2006.01)
*H01G 4/232* (2006.01)
(Continued)

(52) U.S. Cl.
CPC ......... *H01G 4/1227* (2013.01); *H01G 4/0085* (2013.01); *H01G 4/2325* (2013.01); *H01G 4/30* (2013.01)

(58) Field of Classification Search
CPC .. H01G 4/1227; H01G 4/0085; H01G 4/2325; H01G 4/30; H01G 4/008;
(Continued)

(56) References Cited

U.S. PATENT DOCUMENTS 10,964,481 B2 * 3/2021 Chigira ................ H01G 4/1227
11,177,073 B2 * 11/2021 Kawamura .......... H01G 4/1218
(Continued)

FOREIGN PATENT DOCUMENTS

CN 109285698 A * 1/2019 ............. H01G 4/012
CN 110690047 B * 6/2022 ............. H01G 13/00
(Continued)

OTHER PUBLICATIONS

Y. Ogata et al., "X-ray absorption fine structure analysis of molybdenum added to BaTiO3-based ceramics used for multilayer ceramic capacitors", Jpn. J. Appl. Phys. 56, 041101 (2017).
(Continued)

*Primary Examiner* — Dion R. Ferguson
(74) *Attorney, Agent, or Firm* — MORGAN, LEWIS & BOCKIUS LLP

(57) ABSTRACT

A capacitor component includes a body including internal electrode layers and a dielectric layer disposed between the internal electrode layers adjacent to each other and an external electrode disposed on one surface of the body, wherein the internal electrode layer and the dielectric layer separately include molybdenum (Mo), the dielectric layer has a central portion in a thickness direction and an outer portion disposed between the central portion and the internal electrode layer, and the content of molybdenum contained in the central portion of the dielectric layer is less than the content of molybdenum (Mo) contained in the outer portion of the dielectric layer.

23 Claims, 3 Drawing Sheets

(51) Int. Cl.
*H01G 4/008* (2006.01)
*H01G 4/30* (2006.01)

(58) Field of Classification Search
CPC .......... H01G 4/012; H01G 4/12; H01G 4/224; H01G 4/232
See application file for complete search history.

(56) References Cited

U.S. PATENT DOCUMENTS

| | | | | |
|---|---|---|---|---|
| 2006/0023398 | A1* | 2/2006 | Iwanaga | H01G 4/0085 361/321.2 |
| 2006/0221547 | A1* | 10/2006 | Miura | H01G 4/008 361/305 |
| 2016/0189865 | A1* | 6/2016 | Kawamura | H01G 4/012 361/301.4 |
| 2017/0152187 | A1* | 6/2017 | Nagaoka | C01G 23/006 |
| 2017/0372841 | A1* | 12/2017 | Kawamura | B32B 18/00 |
| 2018/0174752 | A1* | 6/2018 | Yanagisawa | H01G 4/30 |
| 2019/0237262 | A1* | 8/2019 | Nagaoka | H01G 4/008 |
| 2020/0411242 | A1* | 12/2020 | Hashimoto | H01G 4/1227 |
| 2021/0175016 | A1 | 6/2021 | Yun et al. | |
| 2021/0183582 | A1* | 6/2021 | Chigira | H01G 4/1227 |
| 2023/0135292 | A1* | 5/2023 | Kang | H01G 4/008 361/301.4 |

FOREIGN PATENT DOCUMENTS

| | | |
|---|---|---|
| KR | 10-2006-0048957 A | 5/2006 |
| KR | 10-2006-0105585 A | 10/2006 |
| KR | 10-2021-0071496 A | 6/2021 |

OTHER PUBLICATIONS

Hu, J. et al., "Thermal analysis of electrodeposited nano-grained Ni—Mo alloys", Scripta Materialia, 154, 182-185 (2018).

C.Z. Hargather et al., "A comprehensive first-principles study of solute elements in dilute Ni alloys: Diffusion coefficients and their implications to tailor creep rate", Acta Materialia, 157, 126-141 (2018).

H. Alves et al., "Aqueous Corrosion of Nickel and its Alloys", Reference Module in Materials Science and Materials Engineering (2016).

* cited by examiner

CAPACITOR COMPONENT

CROSS-REFERENCE TO RELATED APPLICATION(S)

This application claims benefit of priority to Korean Patent Application No. 10-2021-0146877 filed on Oct. 29, 2021 in the Korean Intellectual Property Office, the disclosure of which is incorporated herein by reference in its entirety.

TECHNICAL FIELD

The present disclosure relates to a capacitor component.

BACKGROUND

MLCCs, capacitor components, are important chip components used in industries such as the communications, computing, home appliance, and automobile industries, due to compactness, ensured high capacitance, and ease of mounting thereof, and in particular, are key passive devices used in various electric, electronic information communication devices such as mobile phones, computers, digital TVs.

In accordance with demand for higher performance of MLCCs, dielectric layers have become thinner. However, when the dielectric layer becomes thinner, capacitance may be improved, but other characteristics, for example, temperature characteristics and electrical characteristics, such as DC-bias, as well as reliability, may be deteriorated.

SUMMARY

Exemplary embodiments provide a capacitor component having improved reliability.

According to an aspect of the present disclosure, a capacitor component includes a body including internal electrode layers and a dielectric layer disposed between the internal electrode layers adjacent to each other and an external electrode disposed on one surface of the body, wherein the internal electrode layer and the dielectric layer separately include molybdenum (Mo), the dielectric layer has a central portion in a thickness direction and an outer portion disposed between the central portion and the internal electrode layer, and the content of molybdenum contained in the central portion of the dielectric layer is less than the content of molybdenum (Mo) contained in the outer portion of the dielectric layer.

According to an aspect of the present disclosure, a capacitor component includes a body including internal electrode layers and a dielectric layer disposed between the internal electrode layers adjacent to each other, wherein the internal electrode layer and the dielectric layer separately include molybdenum (Mo), the dielectric layer has a central portion in a thickness direction and an outer portion disposed between the central portion and the internal electrode layer, a content of molybdenum contained in the central portion of the dielectric layer is less than a content of molybdenum (Mo) contained in the outer portion of the dielectric layer, and a content of molybdenum (Mo) contained in the outer portion of the dielectric layer is 0.5 at % to 1 at % with respect to 100 at % of barium (Ba).

According to an aspect of the present disclosure, a capacitor component includes a body including internal electrode layers and a dielectric layer disposed between the internal electrode layers adjacent to each other, wherein the internal electrode layer and the dielectric layer separately include molybdenum (Mo), a content of molybdenum (Mo) contained in the internal electrode layer is 0.1 wt % to 5 wt % with respect to 100 wt % of nickel, the dielectric layer has a central portion in a thickness direction and an outer portion disposed between the central portion and the internal electrode layer, a content of molybdenum (Mo) contained in the central portion of the dielectric layer is 0.05 at % to 0.5 at % with respect to 100 at % of barium (Ba), and a content of molybdenum (Mo) contained in the outer portion of the dielectric layer is 0.5 at % to 1 at % with respect to 100 at % of barium (Ba).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
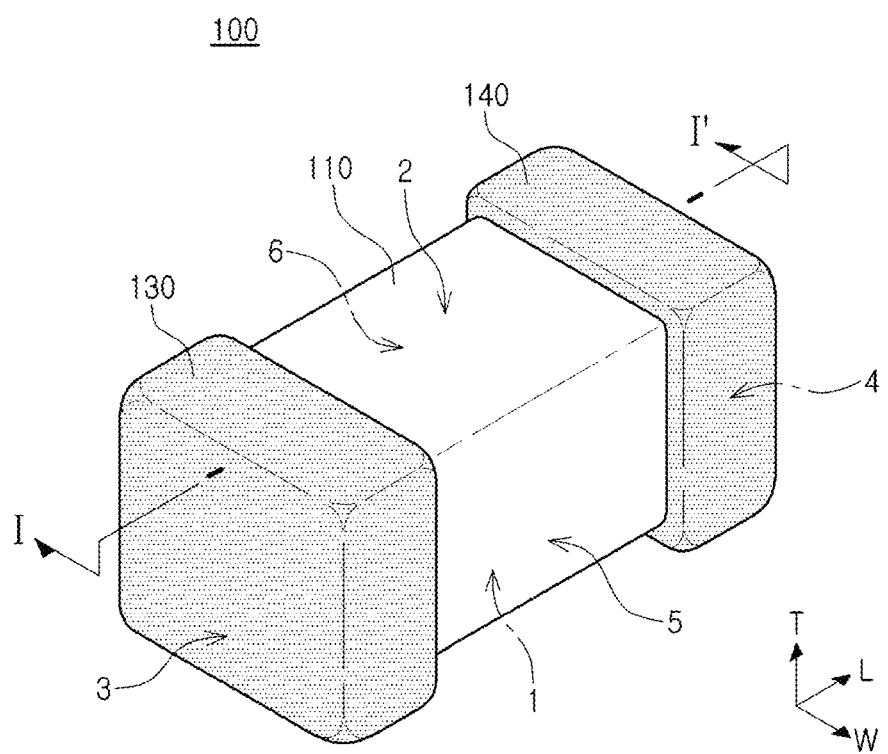
FIG. 1 is a view schematically illustrating a capacitor component according to an exemplary embodiment in the present disclosure.

Hereinafter, the exemplary embodiments in the present disclosure will be described in detail with reference to the accompanying drawings.

However, various changes in form and details may be made within the scope of the present invention, and the scope of the present invention is not limited to the embodiments described below.

The embodiments are provided that this disclosure will be thorough and complete, and will fully convey the scope of the invention to those of ordinary skill in the art.

In the drawings, shapes and dimensions of elements may be exaggerated for clarity.

In the following description, components having the same function within the same scope illustrated in the drawings of the embodiments are illustrated using the same reference numerals.

Throughout the specification, when an element is referred to as "comprising," it means that it can include other elements as well, without excluding other elements, unless specifically stated otherwise.

In addition, throughout the specification, to be formed on "on" means properly formed not only in direct contact, but also should be interpreted appropriately according to the context, which may mean that it may further include other components.

In order to clearly illustrate the present invention in the drawings, thicknesses are enlarged in order to clearly illustrate various layers and regions, and parts not related to the description are omitted, and similar parts are denoted by similar reference numerals throughout the specification.

Figure 2:
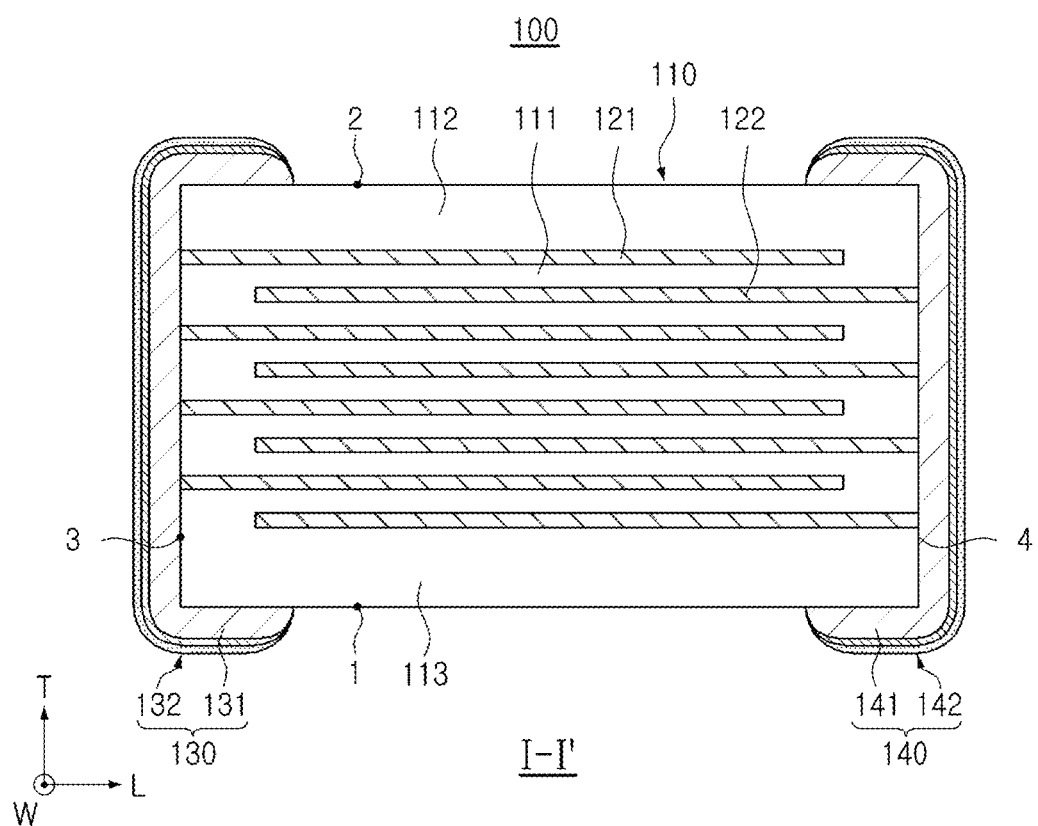
FIG. 2 is a schematic cross-sectional view taken along line I-I' of FIG. 1.
Figure 3:
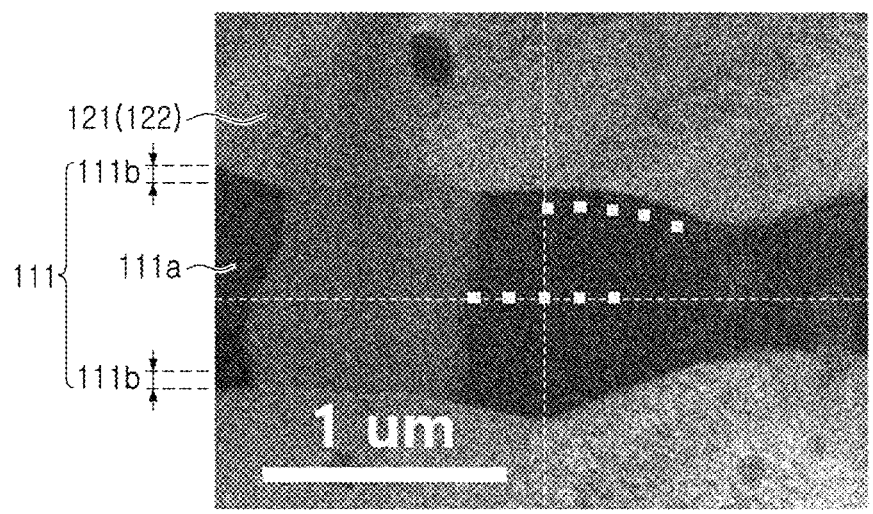
FIGS. 3 and 4 each schematically illustrate a transmission electron microscope (TEM) image of a region of a body.
Figure 4:
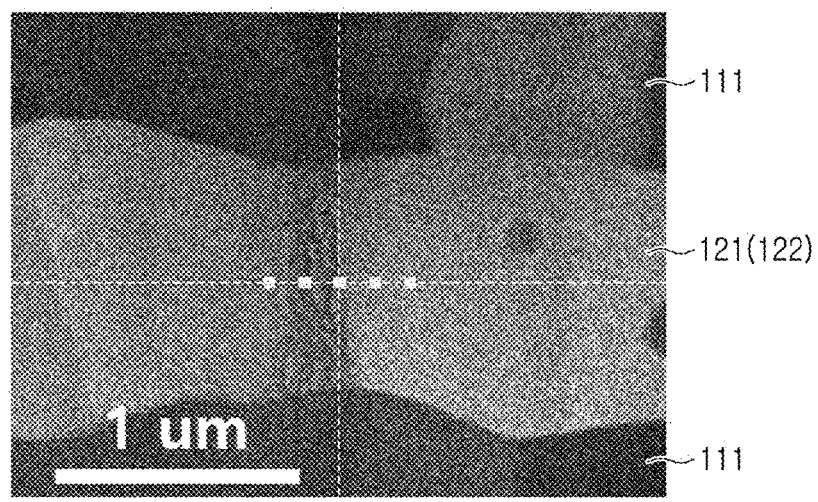

FIG. 1 is a view schematically illustrating a capacitor component according to an exemplary embodiment in the present disclosure. FIG. 2 is a schematic cross-sectional view taken along line I-I' of FIG. 1. FIGS. 3 and 4 each schematically illustrate a transmission electron microscope (TEM) image of a region of a body.

Referring to FIGS. 1 and 2, a capacitor component 100 according to an exemplary embodiment in the present disclosure includes a body 110 and first and second external electrodes 130 and 140.

The body 110 may include an active region as a portion contributing to the formation of capacitance of a capacitor and upper and lower covers 112 and 113 formed on upper and lower surfaces of the active region as upper and lower margins, respectively.

In an exemplary embodiment in the present disclosure, the body 110 is not particularly limited in shape but may have a substantially hexahedral shape. That is, the body 110 may not have a perfect hexahedral shape, but may have a substantially hexahedral shape due to a difference in thickness according to an arrangement of the internal electrode layers 121 and 122 and polishing of the corners.

In order to clearly describe the exemplary embodiment in the present disclosure, directions of a hexahedron are defined as follows: L, W, and T indicated in the drawing represent length direction, width direction, and thickness direction, respectively. Here, the thickness direction may be used as the same concept as a stacking direction in which dielectric layers are stacked.

In addition, in the body 110, both surfaces opposing each other in the T direction are defined as first and second surfaces 1 and 2, both surfaces connected to the first and second surfaces 1 and 2 and opposing each other in the L direction are defined as the third and fourth surfaces 3 and 4, and both surfaces connected to the first and second surfaces 1 and 2, connected to the third and fourth surfaces 3 and, 4, opposing each other in the W direction are defined as fifth and sixth surfaces 5 and 6. In this case, the first surface 1 may be a mounting surface.

The active region may have a structure in which a plurality of dielectric layers 111 are provided and a plurality of first and second internal electrode layers 121 and 122 are alternately stacked with the dielectric layer 111 interposed therebetween.

The dielectric layer 111 may be formed using a ceramic powder having a high dielectric constant, for example, a barium titanate ($BaTiO_3$)-based or strontium titanate ($SrTiO_3$)-based powder, but the present disclosure is not limited thereto. Here, for example, forming the dielectric layer 111 using barium titanate ($BaTiO_3$)-based powder means that barium titanate ($BaTiO_3$) powder is used as a main component, and subcomponent powder is added to the main component. The subcomponent may include a compound (which refers to oxide or nitride) including cations of an element that may substitute or interstitial a lattice position, i.e., A-site and/or B-site of barium (Ba) and/or titanium (Ti) in a perovskite structure ($ABO_3$) of barium titanate ($BaTiO_3$).

A thickness of the dielectric layer 111 may be randomly changed according to a capacity design of the capacitor component 100, and a thickness of a first layer may be configured to range of 0.1 μm to 10 μm after sintering in consideration of the size and capacity of the body 110. However, the present disclosure is not limited thereto. Meanwhile, the thickness of the dielectric layer 111 may refer to an arithmetic average value obtained by measuring, in the L direction a plurality of times, dimensions of any one dielectric layer 111 in the T direction shown in an optical microscope photograph, an SEM photograph, or a TEM photograph of an L-T section of the body 100 taken from the central portion in the W direction. Here, the measurements in the L direction may be made a plurality of times at equal intervals in the L direction, but the present disclosure is not limited thereto. Alternatively, the thickness of the dielectric layer 111 may refer to a value obtained by calculating an arithmetic average value of the numerical value of each of the plurality of dielectric layers 111 shown in the photograph in the T direction described above and dividing the sum of the arithmetic average values by a total number of the dielectric layers 111.

The first and second internal electrode layers 121 and 122 may be disposed to face each other with the dielectric layer 111 interposed therebetween.

The first and second internal electrode layers 121 and 122 may be formed by printing a conductive paste containing a conductive metal to a predetermined thickness on a dielectric green sheet for forming the dielectric layer 111, the first and second internal electrodes 121 and 122 may be stacked with the dielectric green sheet therebetween in a stacking direction of the dielectric green sheet, and thereafter, a resultant stack may be sintered. The first and second internal electrode layers 121 and 122 may be formed to be alternately exposed through the third and fourth surfaces of the body 110 formed by sintering the stack, and may be electrically insulated from each other by the dielectric layer 111 disposed therebetween.

The first and second internal electrode layers 121 and 122 may be electrically connected to the first and second external electrodes 130 and 140 through portions of the third and fourth surfaces 3 and 4 of the body 110 through which the first and second internal electrodes 121 and 122 are alternately exposed.

Accordingly, when a voltage is applied to the first and second external electrodes 130 and 140, electric charges are accumulated between the first and second internal electrode layers 121 and 122 facing each other, and here, capacitance of the capacitor component 100 is proportional to an area of a region in which the first and second internal electrode layers 121 and 122 overlap each other.

A thickness of each of the first and second internal electrode layers 121 and 122 may be determined according to a purpose. For example, the thickness of each of the first and second internal electrode layers 121 and 122 may be determined to be within a range of 0.1 μm to 1.0 μm in consideration of a size and capacity of the ceramic body 110, but the present disclosure is not limited thereto. Meanwhile, as an example, the thickness of the first internal electrode layer 121 may be calculated by the same measuring method as the method of measuring the thickness of the dielectric layer 111 described above.

Each of the dielectric layer 111 and the internal electrode layers 121 and 122 may contain molybdenum (Mo). That is, the dielectric layer 111 may contain molybdenum (Mo), the first internal electrode layer 121 may contain molybdenum (Mo), and the second internal electrode layer 122 may contain molybdenum (Mo).

When the dielectric layer 111 contains molybdenum (Mo), molybdenum (Mo) may function as a donor to improve reliability characteristics of the dielectric layer 111. That is, for example, when the dielectric layer 111 includes a $BaTiO_3$-based dielectric, molybdenum (Mo), known as +6-valent, may replace at least a portion of Ti sites of the $BaTiO_3$-based dielectric, in which case molybdenum (Mo) may be applied as a donor to lower the concentration of oxygen vacancies in the dielectric layer 111. Accordingly, the reliability characteristics of the dielectric layer 111 may be improved.

When the internal electrode layers 121 and 122 include molybdenum (Mo), reliability characteristics of the internal electrode layers 121 and 122 may be improved. That is, most of molybdenum (Mo) contained in the internal electrode layers 121 and 122 forms an alloy with nickel (Ni) of the internal electrode layers 121 and 122 during a heat treatment process of calcination and sintering, and since a melting point (2623° C.) of molybdenum (Mo) is higher than a melting point (1455° C.) of nickel (Ni) by 1000° C. or more, high thermal stability may be obtained when the internal electrode layers 121 and 122 include a nickel (Ni)-molybdenum (Mo) alloy. In addition, in the case of a nickel (Ni)-molybdenum (Mo) alloy, molybdenum (Mo), a heterogeneous element, tends to be pinned at grain boundaries of grains constituting the internal electrode layers 121 and 122, and thus, grains of the internal electrode layers 121 and 122 may be reduced to be smaller. In addition, the nickel (Ni)-molybdenum (Mo) alloy has a diffusion coefficient different by more than 100 times, compared to other nickel-based alloys, and, during the sintering process, may have an effect of improving flatness and connectivity of the internal electrode layers 121 and 122. In addition, the nickel (Ni)-molybdenum (Mo) alloy is widely known as an alloy having excellent corrosion resistance. In the present exemplary embodiment, the internal electrode layers 121 and 122 include the nickel (Ni)-molybdenum (Mo) alloy, and thus, defects caused by nickel (Ni) corrosion during a plating process for forming external electrodes and the like may be improved. As a result, improved characteristics may be exhibited even in high-temperature, high-humidity reliability evaluation. In addition, the nickel (Ni)-molybdenum (Mo) alloy is mainly distributed in an interfacial region of the internal electrode layers 121 and 122, and since the melting point (2623° C.) of molybdenum (Mo) is very higher than the melting point (1625° C.) of BaTiO$_3$, it is effective to overcome sintering mismatch between the internal electrode layers 121 and 122 and the dielectric layer 111 that occurs during sintering.

The dielectric layer 111 may have a central portion 111a in the thickness direction T, and an outer portion 111b disposed between the central portion 111a and the internal electrode layers 121 and 122, and the content of molybdenum (Mo) contained in the central portion 111a of the dielectric layer 111 may be less than the content of molybdenum (Mo) contained in the outer portion 111b of the dielectric layer 111. The molybdenum (Mo) content of the internal electrode layers 121 and 122 may be higher than the molybdenum (Mo) content at each of the central portion 111a and the outer portion 111b of the dielectric layer 111. That is, the content of molybdenum (Mo) in the dielectric layer 111 may be different for each region, and may be higher in the outer portion 111b that is relatively close to the internal electrode layers 121 and 122 of the dielectric layer 111. This may be because molybdenum (Mo) contained in a relatively high content in the internal electrode layers 121 and 122 diffuses into the dielectric layer 111 during the sintering process, but the scope of the present disclosure is not limited thereto. Since the content of molybdenum (Mo) is higher in the outer portion 111b of the dielectric layer 111 relatively close to the internal electrode layers 121 and 122, the reliability of the capacitor component 100 according to the present exemplary embodiment may be improved. Specifically, since the melting point (2623° C.) of molybdenum (Mo) is much higher than the melting point (1625° C.) of BaTiO$_3$, which is a dielectric, sintering mismatch between the internal electrode layers 121 and 122 and the dielectric layer 111 occurring during sintering may be reduced by increasing the content of molybdenum (Mo) in a region close to the interface between the dielectric layer 111 and the internal electrode layers 121 and 122. Here, the outer portion 111b of the dielectric layer 111 may refer to a region up to 50 nm from the interface between the dielectric layer 111 and the internal electrode layers 121 and 122 toward the central portion 111a of the dielectric layer 111. Also, the central portion 111a of the dielectric layer 111 may refer to a region of the dielectric layer 111 excluding the upper and lower outer portions 111b of the dielectric layer 111.

The content of molybdenum (Mo) contained in the central portion 111a of the dielectric layer 111 may be obtained by acquiring a content of molybdenum (Mo) at each of a plurality of points in the central portion 111a of the dielectric layer 111 by performing TEM-EDS mapping on the plurality of points in a length directional-thickness directional cross-section (L-T cross-section) taken from the center of the capacitor component 100 in the width direction W, and arithmetically averaging the acquired contents. As an example, referring to FIG. 3, the content of molybdenum (Mo) at the central portion 111a of the dielectric layer 111 may refer to an arithmetic average value of the contents of molybdenum (Mo) obtained by performing TEM-EDS on 5 points spaced apart from each other at an interval of 100 nm at the central portion 111a of the dielectric layer 111. The content of molybdenum (Mo) may be obtained by acquiring a content of molybdenum (Mo) for each of a plurality of points at the outer portion 111b of the dielectric layer 111 by performing TEM-EDS mapping on the points in a length directional-thickness directional cross-section (L-T cross-section) taken at the center of the capacitor component 100 in the width direction W and arithmetically averaging the acquired contents.

For example, referring to FIG. 3, the content of molybdenum (Mo) in the outer portion 111b of the dielectric layer 111 may be a value obtained by performing TEM-EDS on five points away by 50 nm toward the central portion 111a of the dielectric layer 111 from an interface between each dielectric layer 111 and the internal electrode layers 121 and 122 and spaced apart from each other at an interval of 100 nm, and arithmetically averaging the obtained contents of molybdenum (Mo). The content of molybdenum (Mo) contained in the internal electrode layers 121 and 122 may be obtained by performing TEM-EDS mapping on a plurality of points of any one of the internal electrode layers 121 and 122 disposed at the center in the thickness direction T in the length directional-thickness directional cross-section (L-T cross-section) taken at the center of the capacitor component 100 in the width direction to obtain contents of molybdenum (Mo) of each point, and arithmetically averaging the obtained contents of molybdenum (Mo). For example, referring to FIG. 4, the content of molybdenum (Mo) contained in the internal electrode layers 121 and 122 may refer to a value obtained by performing TEM-EDS on five points disposed at the center of the internal electrode layers 121 and 122 in the thickness direction T and spaced apart from each other at an interval of 100 nm to obtain the contents of molybdenum (Mo) and arithmetically averaging the contents of molybdenum (Mo).

In the central portion 111a of the dielectric layer 111, molybdenum (Mo) may be contained in an amount of 0.05 at % or more and 0.5 at % or less with respect to 100 at % of barium (Ba). If the content of molybdenum (Mo) is less than 0.05 at %, defects may occur in the accelerated life test (HALT). When the content of molybdenum (Mo) is more than 0.5 at %, a defect may occur in a highly accelerated life test (HALT) and a withstand voltage characteristic may be reduced. In the outer portion 111b of the dielectric layer 111, molybdenum (Mo) may be contained in an amount of 0.5 at % or more and 1 at % or less with respect to 100 at % of barium (Ba).

In the internal electrode layers 121 and 122, molybdenum (Mo) may be contained in an amount of 0.1 wt % or more and 5 wt % or less with respect to 100 wt % of nickel (Ni).

If the content is less than 0.1 wt % or more than 5 wt %, at least one of a decrease in withstand voltage characteristics, a HALT failure, and an 8585 test failure may occur.

The upper and lower covers 112 and 113 may be formed of the same material as the dielectric layer 111 of the active region except that the internal electrode layer is not included. Alternatively, the covers 112 and 113 may be formed using ceramic dielectric powder, a material different from that of the dielectric layer 111. Here, forming the covers 112 and 113 using a ceramic dielectric powder of a material different from that of the dielectric layer 111 may mean that a dielectric powder used to form the covers 112 and 113 and a dielectric powder for forming the dielectric layer 111 include the same elements but the ratio therebetween is different, may mean that the types of elements of the subcomponents mentioned above are different, or may mean that the contents of elements of the subcomponents mentioned above are different.

The upper and lower covers 112 and 113 may be formed by stacking a single dielectric layer or two or more dielectric layers on the upper and lower surfaces of the active region in the T-direction, and basically serve to prevent damage to the first and second internal electrode layers 121 and 122 due to physical or chemical stress.

The external electrodes 130 and 140 are disposed on the third and fourth surfaces 3 and 4 of the body 100 and are connected to the internal electrode layers 121 and 122. Specifically, the first external electrode 130 is disposed on the third surface 3 of the body 110 and is connected to the first internal electrode layer 121 exposed to the third surface 3 of the body 110. The second external electrode 140 is disposed on the fourth surface 4 of the body 110 and is connected to the second internal electrode layer 122 exposed to the fourth surface 4 of the body 110. The first and second external electrodes 130 and 140 may include first electrode layers 131 and 141 and second electrode layers 132 and 142 disposed on the first electrode layers 131 and 141, respectively. Meanwhile, the first and second external electrodes 130 and 140 differ only in terms of a connection relationship with the internal electrode layers 121 and 122 and a position formed on the body 110. Therefore, hereinafter, for convenience of explanation, the first external electrode 130 disposed on the third surface 3 of the body 110 will mainly be described, and the description of the second external electrode 140 will be omitted. A description of the first external electrode 130 that will be described below may be equally applied to the second external electrode 140.

The first electrode layer 131 is in contact with and directly connected to the first internal electrode layer 121 exposed through the third surface 3 of the body 110 to ensure electrical conduction between the first external electrode 130 and the first internal electrode layer 121. The first electrode layer 131 may be formed by applying a conductive paste including a conductive powder including at least one of copper (Cu) and silver (Ag) and then curing or firing the conductive paste. As another example, the first electrode layer 131 may be a copper (Cu) plating layer.

The second electrode layer 132 may be disposed on the first electrode layer 131. As a non-limiting example, the second electrode layer 132 may be a plating layer formed by electroplating. The second electrode layer 132 may have a structure in which, for example, a nickel plating layer and a tin plating layer are sequentially stacked.

The first external electrode 130 may include a connection portion formed on the third surface 3 of the body and a band portion extending to at least a portion of each of the first surface 1, the second surface 2, the fifth surface, and the sixth surface of the body 110 from the connection portion. However, the scope of the present exemplary embodiment is not limited to the above description, and the first external electrode 130 may be variously modified into, for example, an L shape, a C shape, and the like.

Table 1 below shows a breakdown voltage (BDV) evaluation and HALT according to a change in the content of molybdenum in the central portion of the dielectric layer. Table 2 below shows results of performing BDV evaluation, HALT and moisture resistance reliability evaluation (8585) as the content of molybdenum changes in the internal electrode layer, while the content of molybdenum at the central portion of the dielectric layer is fixed.

In the tables below, "Mo content of the dielectric layer" is a ratio of at % of molybdenum to 100 at % of barium (Ba) after the content of molybdenum and the content of barium were measured in at % at the central portion of the dielectric layer. In the tables below, "Mo content of the internal electrode layer" is a ratio of wt % of molybdenum to 100 wt % of nickel after the content of molybdenum and the content of nickel were measured in wt % in the central region of the internal electrode layer in the thickness direction.

The following experimental examples differ only in the content of molybdenum as described above, and the remaining conditions, for example, i) the composition of the dielectric green sheet, ii) the composition and content of the ceramic powder included in the conductive paste for forming the internal electrode layer, iii) size of green body (L*W*T), iv) sintering conditions such as elevated temperature conditions and sintering atmosphere, v) total number of dielectric layers, vi) total number of internal electrode layers, vii) average thickness of internal electrode layers, viii) the average thickness of the dielectric layer, and ix) the composition and formation conditions of the external electrode were the same. For example, in all of Experimental Examples 1 to 5, the average thickness of each internal electrode layer was 480 nm, the average thickness of each dielectric layer was 550 nm, the total number of internal electrode layers was 287, and the size of the green body was L=785 μm, W=440 μm, T=430 μm, the same as each other.

As for the BDV evaluation, for 20 samples for each experimental example, a breakdown voltage was measured, and a sample whose average value did not reach an evaluation reference voltage (e.g., 36.5 V) was determined to be defective (X).

As for the HALT evaluation, for 40 samples for each experimental example, the degree of degradation of insulation resistance was measured, while a DC voltage of 1.5 Vr was maintained to be applied at 150° C. Here, each sample was evaluated for 12 hours and the degree of degradation of resistance was checked, and a case in which there is 1/10 or more of the samples whose insulation resistance was dropped by 2 orders or more ($10^2$ or more) compared to an initial insulation resistance were 1/10 or more was determined to be defective (X).

As for the moisture resistance reliability evaluation (8585) is, for 40 samples for each experimental example, a change in insulation resistance (IR) over time t was measured under experimental conditions in which temperature was 85° C., relative humidity was 85%, and applied voltage was 1.5 Vr. After evaluation for 6 hours, a case in which there is 1/10 or more ($10^2$ or more) compared to an initial insulation resistance was determined to be defective (X).

TABLE 1

| | Mo content of dielectric layer | BDV | HALT |
|---|---|---|---|
| 1 | 0 | ○ | X |
| 2 | 0.1 | ○ | ○ |
| 3 | 0.3 | ○ | ○ |
| 4 | 0.5 | ○ | ○ |
| 5 | 0.7 | X | X |

Referring to Table 1, in Experimental Example 1 in which the molybdenum (Mo) content (ratio to barium content) at the central portion 111a was less than 0.05, HALT failure occurred. In Experimental Example 5 in which the molybdenum (Mo) content (ratio to barium content) at the central portion 111a was greater than 0.5, defects occurred in both the BDV evaluation and the HALT evaluation.

TABLE 2

| | Mo content of dielectric layer | Mo content of internal electrode layer | BDV | HALT | 8585 |
|---|---|---|---|---|---|
| 6 | 0.1 | 0 | ○ | ○ | X |
| 7 | | 0.5 | ○ | ○ | ○ |
| 8 | | 1 | ○ | ○ | ○ |
| 9 | | 3 | ○ | ○ | ○ |
| 10 | | 5 | ○ | ○ | ○ |
| 11 | | 7 | X | X | X |
| 12 | 0.3 | 0 | ○ | ○ | X |
| 13 | | 0.5 | ○ | ○ | ○ |
| 14 | | 1 | ○ | ○ | ○ |
| 15 | | 3 | ○ | ○ | ○ |
| 16 | | 5 | ○ | ○ | ○ |
| 17 | | 7 | X | X | X |

Referring to Table 2, in Experimental Examples 6 and 12 in which the content of molybdenum (Mo) in the internal electrode layer (ratio to nickel content) was less than 0.1, defects occurred in the evaluation of 8585. In Experimental Examples 11 and 17 in which the molybdenum (Mo) content (ratio to nickel content) of the internal electrode layer was greater than 5, defects occurred in all of the BDV evaluation, HALT evaluation, and 8585 evaluation.

As set forth above, according to an exemplary embodiment in the present disclosure, the reliability of the capacitor component may be improved.

While example exemplary embodiments have been shown and described above, it will be apparent to those skilled in the art that modifications and variations could be made without departing from the scope of the present disclosure as defined by the appended claims.

What is claimed is:

1. A capacitor component comprising:
a body including internal electrode layers and a dielectric layer disposed between the internal electrode layers adjacent to each other; and
an external electrode disposed on one surface of the body, wherein
the internal electrode layer and the dielectric layer separately include molybdenum (Mo),
the dielectric layer has a central portion in a thickness direction and an outer portion disposed between the central portion and the internal electrode layer, and
a content of molybdenum contained in the central portion of the dielectric layer is less than a content of molybdenum (Mo) contained in the outer portion of the dielectric layer.

2. The capacitor component of claim 1, wherein the outer portion of the dielectric layer is a region from an interface between the dielectric layer and the internal electrode layer to 50 nm toward the central portion of the dielectric layer.

3. The capacitor component of claim 2, wherein the content of molybdenum (Mo) contained in the outer portion of the dielectric layer is an average value of the content of molybdenum (Mo) at five or more points spaced apart from each other in the outer portion.

4. The capacitor component of claim 3, wherein the content of molybdenum (Mo) contained in the central portion of the dielectric layer is an average value of the content of molybdenum (Mo) at five or more points spaced apart from each other in the central portion.

5. The capacitor component of claim 1, wherein molybdenum (Mo) in the central portion of the dielectric layer is contained in an amount of 0.05 at % to 0.5 at % with respect to 100 at % of barium (Ba).

6. The capacitor component of claim 5, wherein molybdenum (Mo) in the outer portion of the dielectric layer is contained in an amount of 0.5 at % to 1 at % with respect to 100 at % of barium (Ba).

7. The capacitor component of claim 1, wherein the content of molybdenum (Mo) contained in the internal electrode layer is greater than the content of molybdenum (Mo) contained in the central portion of the dielectric layer.

8. The capacitor component of claim 7, wherein the content of molybdenum (Mo) contained in the internal electrode layer is greater than the content of molybdenum (Mo) contained in the outer portion of the dielectric layer.

9. The capacitor component of claim 8, wherein the content of molybdenum (Mo) contained in the internal electrode layer is an average value of the contents of molybdenum (Mo) at five or more points spaced apart from each other in the central portion of the internal electrode layer in a thickness direction.

10. The capacitor component of claim 7, wherein molybdenum (Mo) in the internal electrode layer is contained in an amount of 0.1 wt % to 5 wt % with respect to 100 wt % of nickel.

11. The capacitor component of claim 1, wherein the external electrode includes a first electrode layer disposed on the body and a second electrode layer disposed on the first electrode layer.

12. The capacitor component of claim 11, wherein the second electrode layer includes at least one of nickel (Ni) and tin (Sn).

13. The capacitor component of claim 1, wherein a thickness of the dielectric layer is 0.1 µm to 10 µm.

14. The capacitor component of claim 1, wherein a thickness of each of the internal electrode layers is 0.1 µm to 1.0 µm.

15. A capacitor component comprising:
a body including internal electrode layers and a dielectric layer disposed between the internal electrode layers adjacent to each other,
wherein
the internal electrode layer and the dielectric layer separately include molybdenum (Mo),
the dielectric layer has a central portion in a thickness direction and an outer portion disposed between the central portion and the internal electrode layer,
a content of molybdenum contained in the central portion of the dielectric layer is less than a content of molybdenum (Mo) contained in the outer portion of the dielectric layer, and
a content of molybdenum (Mo) contained in the outer portion of the dielectric layer is 0.5 at % to 1 at % with respect to 100 at % of barium (Ba).

16. The capacitor component of claim 15, wherein a content of molybdenum (Mo) contained in the internal electrode layer is greater than the content of molybdenum (Mo) contained in the outer portion of the dielectric layer.

17. The capacitor component of claim 16, wherein the content of molybdenum (Mo) contained in the internal electrode layer is greater than the content of molybdenum (Mo) contained in the central portion of the dielectric layer.

18. The capacitor component of claim 17, wherein molybdenum (Mo) in the internal electrode layer is contained in an amount of 0.1 wt % to 5 wt % with respect to 100 wt % of nickel.

19. The capacitor component of claim 18, wherein a thickness of the dielectric layer is 0.1 μm to 10 μm.

20. The capacitor component of claim 19, wherein a thickness of each of the internal electrode layers is 0.1 μm to 1.0 μm.

21. A capacitor component comprising:
a body including internal electrode layers and a dielectric layer disposed between the internal electrode layers adjacent to each other,
wherein
the internal electrode layer and the dielectric layer separately include molybdenum (Mo),
a content of molybdenum (Mo) contained in the internal electrode layer is 0.1 wt % to 5 wt % with respect to 100 wt % of nickel,
the dielectric layer has a central portion in a thickness direction and an outer portion disposed between the central portion and the internal electrode layer,
a content of molybdenum (Mo) contained in the central portion of the dielectric layer is 0.05 at % to 0.5 at % with respect to 100 at % of barium (Ba), and
a content of molybdenum (Mo) contained in the outer portion of the dielectric layer is 0.5 at % to 1 at % with respect to 100 at % of barium (Ba).

22. The capacitor component of claim 21, wherein a thickness of the dielectric layer is 0.1 μm to 10 μm.

23. The capacitor component of claim 21, wherein a thickness of each of the internal electrode layers is 0.1 μm to 1.0 μm.

* * * * *